(12) United States Patent
Yang

(10) Patent No.: US 6,360,851 B1
(45) Date of Patent: Mar. 26, 2002

(54) CASTER STRUCTURE WITH FUNCTIONS OF BRAKE AND ROTATION CONSTRAINT

(76) Inventor: Sung-Wang Yang, No. 258-15, An-Ting, An Chia Tsun, An ting Shiang, Tainan Hsien (TW)

( * ) Notice: Subject to any disclaimer, the term of this patent is extended or adjusted under 35 U.S.C. 154(b) by 0 days.

(21) Appl. No.: 09/754,056

(22) Filed: Jan. 5, 2001

(51) Int. Cl.[7] .............................................. B60B 33/00
(52) U.S. Cl. .................................... 188/1.12; 16/35 R
(58) Field of Search ........................ 188/1.12, 31, 69; 16/35 R

(56) References Cited

U.S. PATENT DOCUMENTS

| 4,669,580 | A | * | 6/1987 | Neville | 188/1.12 |
| 5,133,106 | A | * | 7/1992 | Milbredt et al. | 188/1.12 |
| 5,181,587 | A | * | 1/1993 | Masatoshi | 188/1.12 |
| 5,232,071 | A | * | 8/1993 | Kawanabe | 188/1.12 |
| 5,368,133 | A | * | 11/1994 | Yang | 188/1.12 |
| 5,415,252 | A | * | 5/1995 | Estokowski | 188/1.12 |
| 5,537,715 | A | * | 7/1996 | Yang | 16/35 R |
| 5,617,934 | A | * | 4/1997 | Yang | 188/1.12 |
| 5,632,360 | A | * | 5/1997 | Melara | 188/1.12 |
| 5,785,154 | A | * | 7/1998 | Chen | 188/1.12 |
| 5,988,323 | A | * | 11/1999 | Chu | 188/1.12 |
| 6,092,262 | A | * | 7/2000 | Lin | 188/1.12 |
| 6,256,835 | B1 | * | 7/2001 | Wang | 16/35 R |

* cited by examiner

Primary Examiner—Christopher P. Schwartz
Assistant Examiner—Robert A. Siconolfi
(74) Attorney, Agent, or Firm—Rosenberg, Klein & Lee

(57) ABSTRACT

The invention, a caster structure with function of brake and rotation constraint, is to form a horizontal container groove on the bottom of a wheel base. One end of the container groove extends upward to form a groove, which joins a vertical shaft opening for the penetration of a shaft. The vertical shaft opening forms an opening with respect to the groove. The shaft forms a positioning groove on a convex ring with respect to the opening. The other end of the container groove is connected with a clip element, of which the connecting portion forms a long-end and a short-end on the basis of the axle center. Inside the container groove is a slide base, which constantly hits the connecting portion of the clip element when it is pushed by a spring. A fixure pin penetrates the other end of the slide base and passes through the slots of the wheel base. On the end of the slide base is a clip block, which is inside the groove and is pushed by a spring. Thus, when the clip element is pushed for dual-brake, the connecting portion rotates and pushes the slide base from the long-end. The fixture pin hits the ditch of the wheel. The clip block moves together with the slide base by the push of a spring to exactly reach the positioning groove on a convex ring. Thus, the wheel brakes and the fixture wheel base stops rotation.

2 Claims, 3 Drawing Sheets

CASTER STRUCTURE WITH FUNCTIONS OF BRAKE AND ROTATION CONSTRAINT

BACKGROUND OF THE INVENTION

1) Field of the Invention

The invention is related to a caster structure, which utilizes a clip element to transversally move two brake elements and to function as a brake with respect to the wheel and the vertical shaft.

2) Description of the Prior Art

As known, for convenient movement, the legs on the bottom of an office chair are casters and are made of plastic material. The general caster is to vertically insert a pin in the wheel base of the caster. By fixing the upper shafts to the bottom ends of the chair legs, the wheel bases are allowed to rotate with respect to the shafts and the chair legs. Thus, the rotation of a wheel body is advantageous to chair movement and the chair functions with brake and rotation constraint. Most of such casters equip a brake device on one side of the wheel body. By pushing the brake device downward, the brake device inside a control wheel base functions as a brake with respect to the inner wheel inside a wheel body and the wheel stops rotation.

The prior caster utilizes a function of pushing brake device downward to stop the brake body inside a wheel base with respect to the wheel. The state of caster braking achieves the objective of fixing chair position with no movement, however, the wheel base can be rotated with respect to the shaft and the movement direction can not be controlled. When the contact condition of the wheel and the ground is not good and minor movement is allowed, the device with the casters can be easily moved and makes the casters further move to certain direction. Also, occasionally, the rotation direction for the casters can not be controlled and the extruded wheel base becomes the obstacle on the ground.

Under the above considerations, the prior caster can not simultaneously function braking and rotation direction fixture. Also, further improvement is needed for the design. On the basis of thorough research and detailed planing with constantly improvement, the inventor finally developed the invention.

SUMMARY OF THE INVENTION

The primary objective of the invention is to provide a caster structure functioning brake and rotation constraint. It is to utilize a single clip element transversally moving two brake elements and to simultaneously function positioning with respect to the wheel and the vertical shaft. The wheel is braked and the wheel base can not be rotated. The characteristics of the main structure are described as follows:

The wheel base is in a semi-circular shape, of which the horizontal bottom interior forms a horizontal container groove. One end of the container groove extends upward to form a groove, which joins a vertical shaft opening for the penetration of a shaft. With respect to the groove on the container groove, the vertical shaft opening extends upward to form an opening. Thus, the shaft with respect to the opening forms a convex ring with a positioning groove. One end of the opening is connected with a clip element. The connecting portion of the clip element equips a long-end and a short-end with respect to the connecting portion center. Inside the container groove is a transversal slide base. One end of the slide base constantly hits the connecting portion of the clip element by the push of a spring element. The lower contact portion forms a bevel angle, which is advantageous to the rotation of the connecting portion of the clip element. On the other end, a fixture pin passes through a slot of the wheel base, thus, the pin extrudes outward to reach the ditch of the wheel. On the end, a clip block is inserted. The block hits the end of the slide base by the push of a spring and transversally moves together with the slide base to the positioning groove of a convex ring on the shaft of the opening. When the clip element is pushed for dual-brake, the connecting portion rotates and pushes the slide base against a spring from the long-end and makes a fixture pin in the ditch of the wheel. By the push of a spring, the clip block moves together with the slide base to the positioning groove of a convex ring on the shaft and no rotation is allowed for the wheel base.

DETAILED DESCRIPTION OF THE PREFERRED EMBODIMENT

Figure 1:
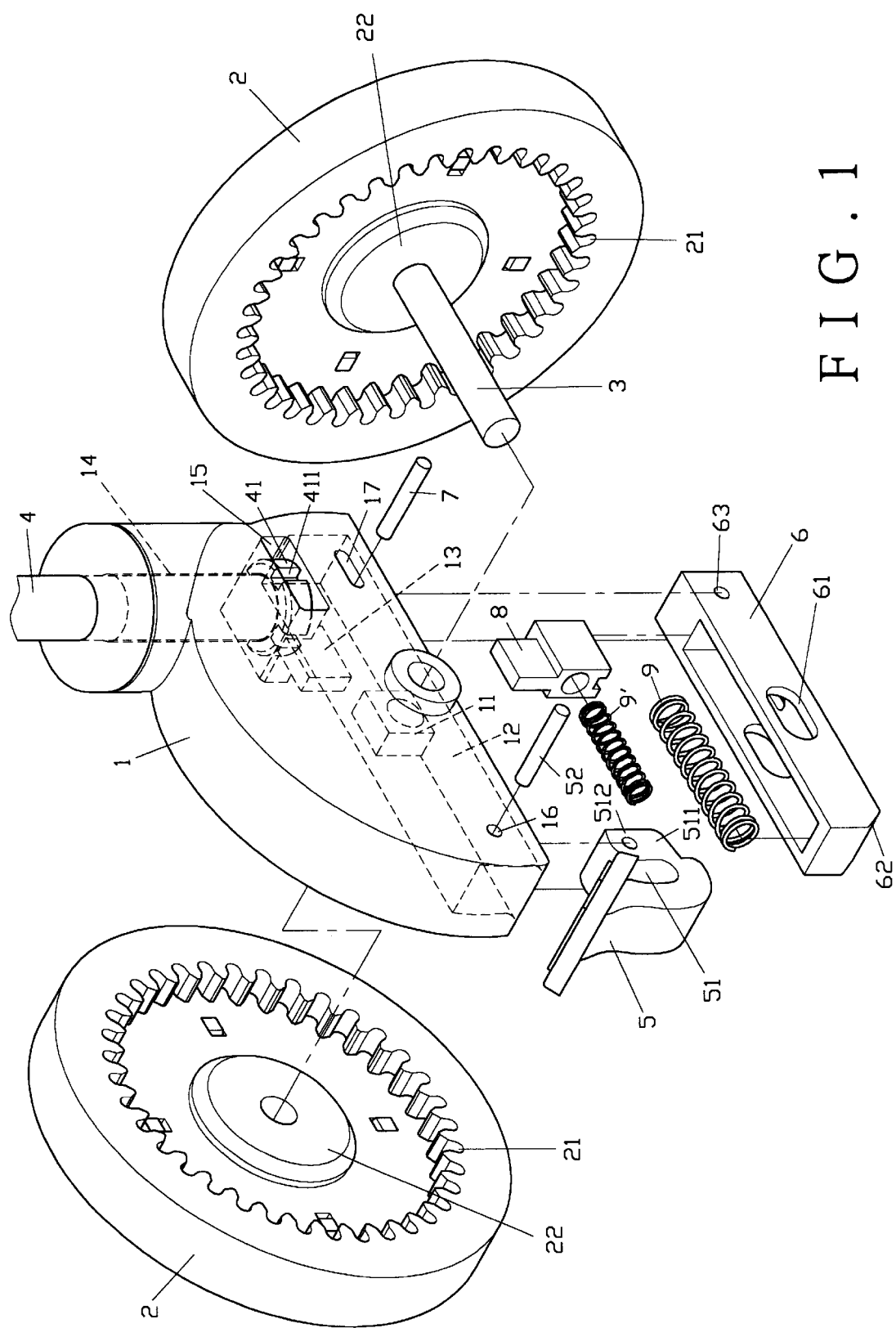
FIG. 1 is the structural drawing of the invention.

As shown in FIG. 1, the caster structure of the invention comprises a wheel base (1), a pair of wheels (2), an axle (3), a shaft (4), a clip element (5), a slide base (6), a fixture pin (7), a clip block (8) and two springs (9) and (9').

The wheel base (1) is in semi-circular shape, of which the horizontal bottom interior forms a horizontal container groove (12), which transversally passes through a central axle opening base (11). One end of the container groove (12) extends upward to form a groove (13), which joins a vertical shaft opening (14) for the penetration of a shaft (4). With respect to the groove (13) on the container groove (12), the vertical shaft opening (14) forms an opening (15). Besides, there is a hole (16) on one end of a clip element (5). On both sides corresponding to the vertical shaft opening (14) end are two slots (17).

The wheel body (2) forms ditches (21) on the inner wheel. A central shaft base (22) passes through the axle opening base (11) of the wheel base (1) with a axle (3) to fix the pair of wheels (2) on the both ends.

The shaft (4) passes through the vertical shaft opening (14) of the wheel base (1). On the relatively location of the opening (15), the shaft (4) forms a convex ring (41), which equips positioning grooves (411) with certain spacing and equivalent angle.

The clip element (5) forms a connecting portion (51) secured in the container groove (12), which allows a pin (52) to penetrate the hole (16) for revolution. The connecting portion (51) equips a long-end (511) and a short-end (512) with respect to the central connecting portion.

The slide base (6) is located in the container groove (12) of the wheel base (1). In the center, it forms a slide groove (61) passes through the axle (3) with respect to the axle opening base (11) of the wheel base (1). One end of the slide base (6) is pushed by a spring (9) to constantly move toward the connecting portion (51) of the clip element (5). On the bottom, a bevel angle (62) is advantageous to the rotation of the connecting portion (51) of the clip element (5). On the other end, there is a pin hole (63) for transversal penetration of a fixture pin (7), which passes through the slot (17) of the wheel base (1).

A clip block (8) is inserted inside one end of the slide base (6) near the fixture pin (7) to join the groove (13) and transversally connects a spring (9'), which pushes the block (8) to hit one end of the slide base (6).

Figure 2:
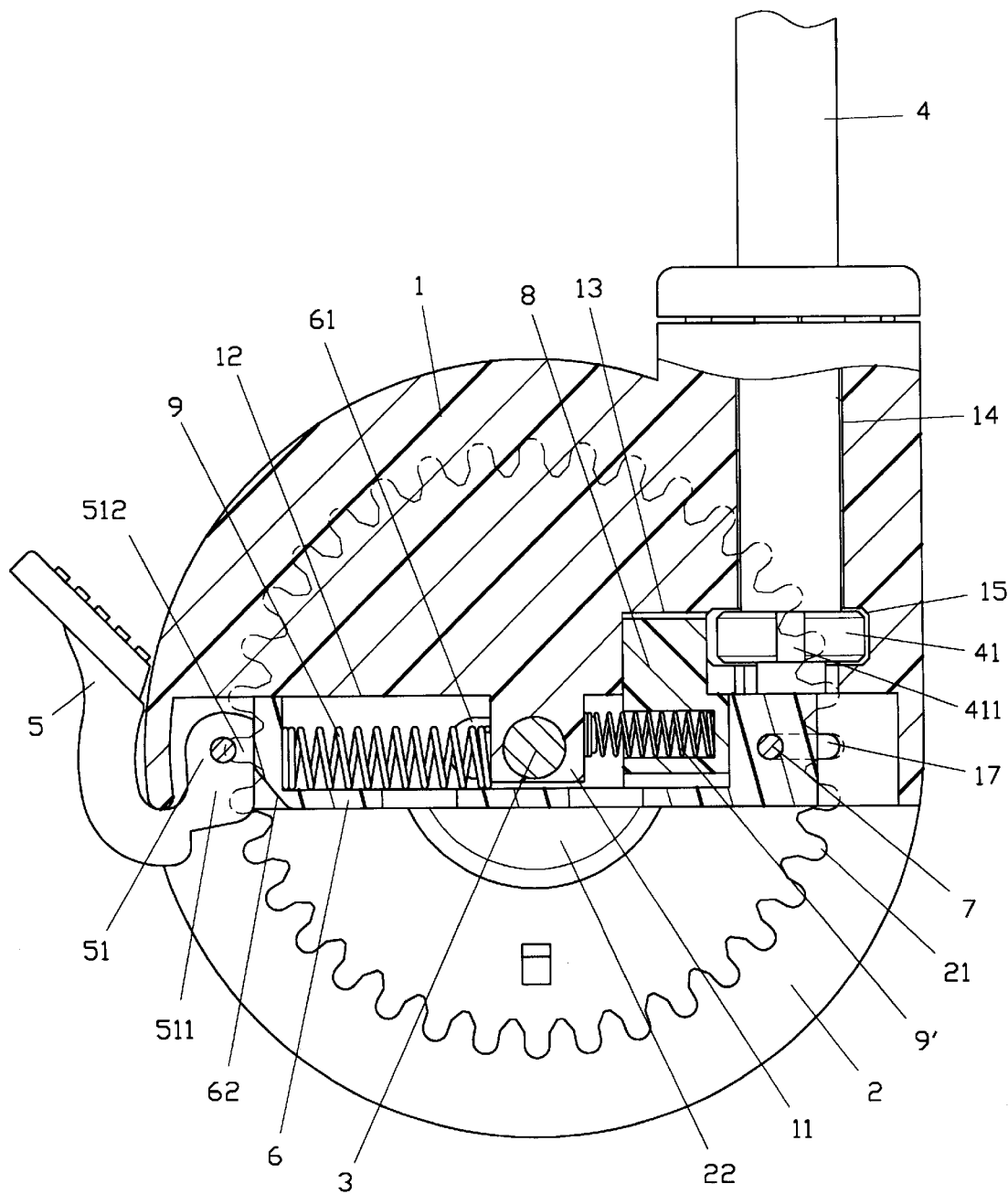
FIG. 2 is sectional assembly drawing of the invention.

As shown in FIG. 2, the container groove (12) inside the bottom of the wheel base (1) equips a transversally movable slide base (6), which hits the connecting portion (51) of the clip element (5) on one end and hits the clip block (8) on the other end. Under such condition, when the clip element (5) is not pushed, the short-end (512) of the connecting portion (51) hits the slide base (6) by the push of a spring (9). Thus, the fixture pin (7) on one end of the slide base (6) withdraws the ditch (21) of the wheel (2) and the clip block (8) hits the slide base (6) by the push of spring (9'). The clip block (8) is located out of the convex ring (41) of the shaft (4) to rotate the wheel (2) and the wheel base (1) toward the shaft (4).

Figure 3:
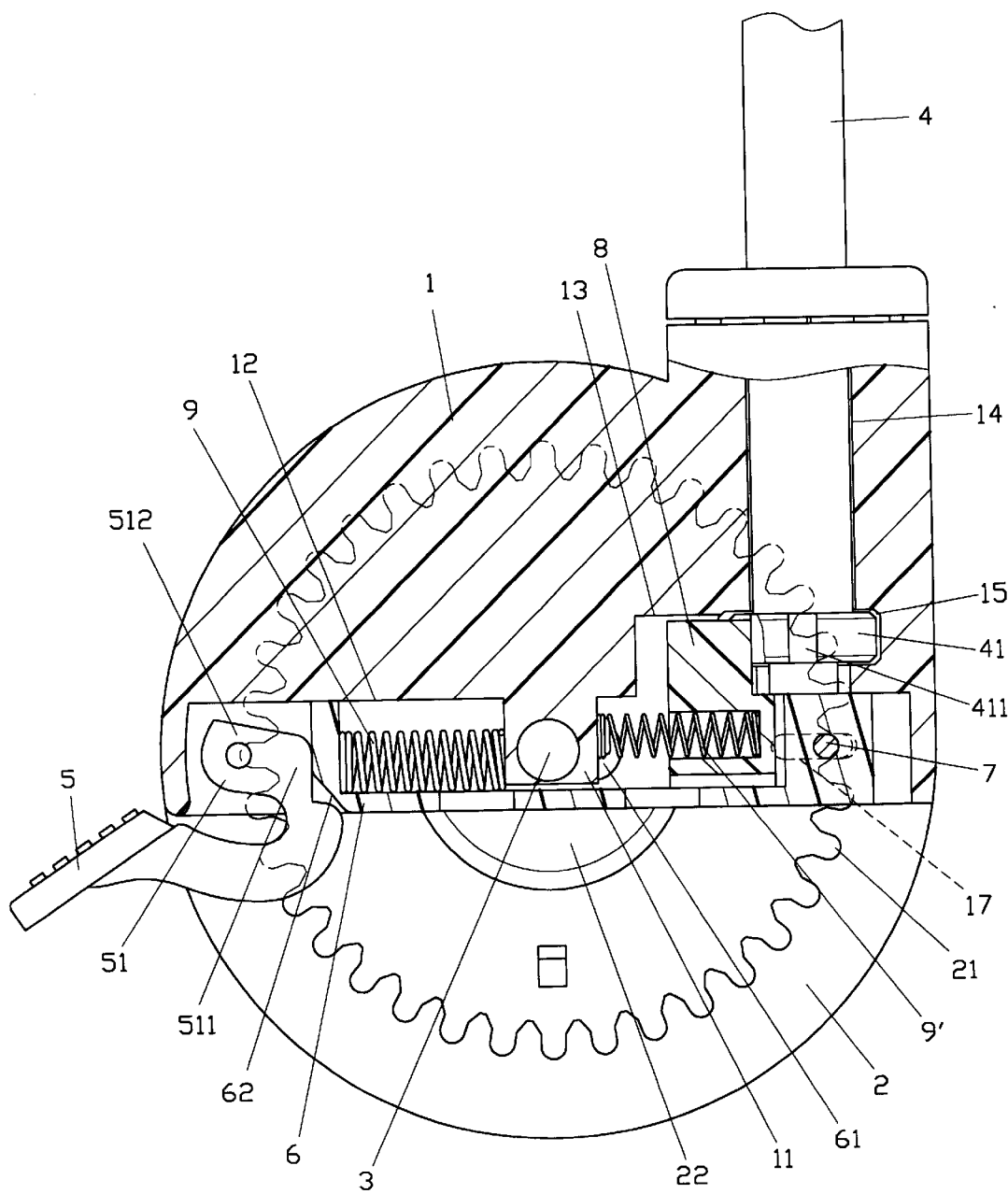
FIG. 3 is a drawing of the invention in a state of dual brakes.

As shown in FIG. 3, when the clip element (5) is pushed for dual-brake, the clip element (5) makes the connecting portion (51) rotate and hit the wheel base (1) along the bevel angle (62) of the slide base (6). Then, the connecting portion (5 1) pushes the slide base (6) against the spring (9) from the long-end (511) and makes the fixture pin (7) move along the slot (17) of the wheel base (1) to hit the ditch (21) of the wheel (2) for the brake function of the wheel (2). Also, the clip block (8) moves together with the slide base (6) by the push of the spring (9') to exactly reach the positioning groove (411) on the convex ring (41) of the shaft (4). The clip block (8) pushed by the spring (9') functions automatic brake through the relative positioning groove (411).

In summary, the invention provides a caster structure with function of brake and rotation constraint. The structure design utilizes a clip element to move or fasten a fixture pin on a slide base and a clip block pushed by a spring element. Thus, the wheel body and vertical shaft simultaneously act as a block function to brake the wheel body and to fix the wheel base with no rotation.

The above explanation is a substantial embodiment of the invention, which provides greater practical performance and simplification than products of prior art. Furthermore, the present invention meets all new patent application requirements and is lawfully submitted for review and the granting of the commensurate patent rights to thereby encourage the spirit of invention and its rightful protection under the patent law.

What is claimed is:

1. The invention of a caster structure functioning brake and stop rotation, comprises of a wheel base, a pair of wheels, an axle, a shaft, a clip element, a slide base, a fixture pin, a clip block and two springs; furthermore, one end of the wheel base forms a vertical shaft opening for penetration of a shaft and on the central bottom of a wheel is an axle hole for the penetration of the axle in connecting two wheels, also the inner of the wheel forms ditches; the inner of the wheel further comprises the wheel base is in a semi-circular shape, of which the horizontal bottom interior forms a horizontal container groove, which transversally passes through a central axle opening base and connects the vertical shaft hole; also, one end of the container groove extends upward to form a groove and there are slots on both sides corresponding to the vertical shaft hole end, while a hole on the other end; moreover, on the corresponding location of the opening, the shaft forms a convex ring with respect to a positioning groove; therefore, the clip element forms a connecting portion secured in the container groove of the wheel base with a pin connection and the connecting portion equips a long-end and a short-end with respect to the connecting portion center; furthermore, the slide base located on the bottom container groove forms a slide groove in the center to correspond the shaft hole on the wheel base for the shaft penetration, also, one end of the slide base is pushed by a spring to constantly move toward the connecting portion of the clip element and on the other end is a pin hole equipped for transversal penetration of a fixture pin, which passes through the slot of the wheel base; moreover, a clip block is inserted inside the slide base on the end with a fixture pin to join the groove and to transversally connect a spring, which pushes the block to hit one end of the slide base; thus, by pushing the clip element for dual-brake, the connecting portion rotates and pushes the slide base from the long-end to make a fixture pin extrude to reach the ditch of the wheel, also, the clip block moves together with the slide base by the push of a spring element to exactly reach the positioning groove on a convex ring, thus, it simultaneously brakes the wheel and fix the wheel base with no rotation.

2. The caster structure with function of brake and rotation constraint as mentioned in claim 1, the lower portion of the slide base forms a bevel angle on the end contacting the connecting portion of a clip element to allow the rotation for the connecting portion of the clip element.

* * * * *